Jan. 13, 1970 R. L. SILBERMAN ET AL 3,489,050
DIE SET PUNCHHOLDER SHANK CONSTRUCTION
Filed March 6. 1968 2 Sheets-Sheet 1
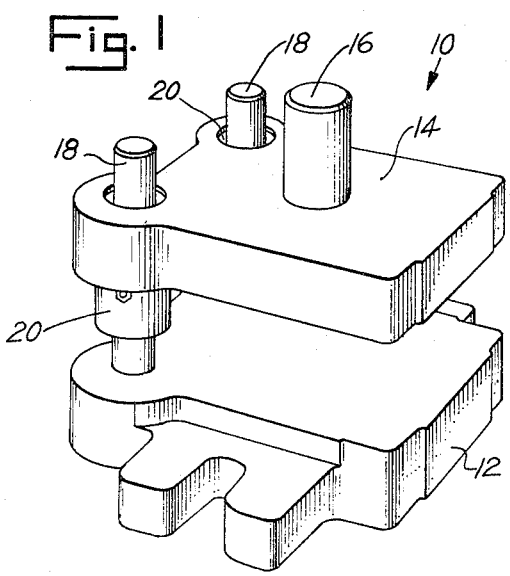
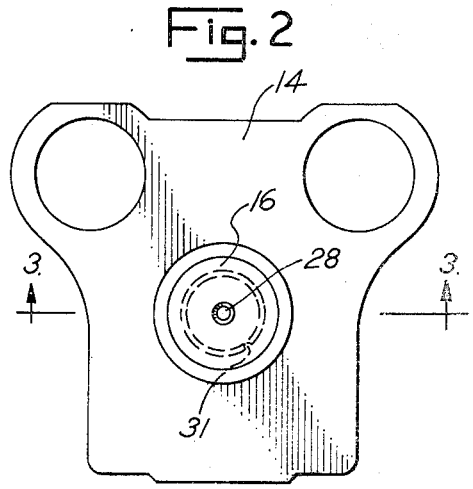
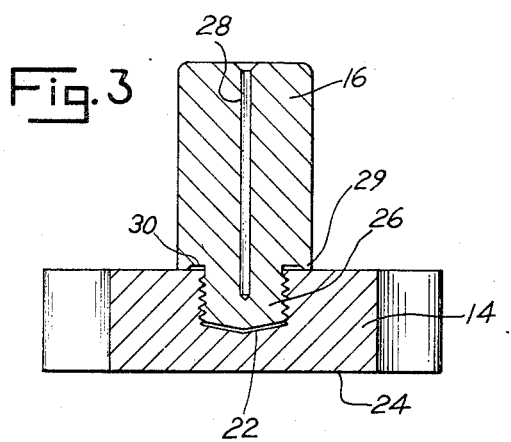
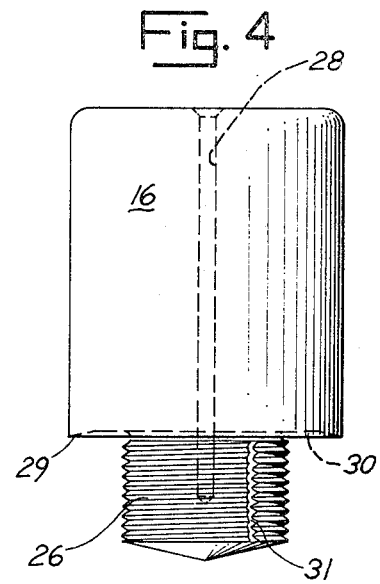
INVENTORS
ROBERT L. SILBERMAN
BY & LESTER L. LOGAN
ATTORNEYS

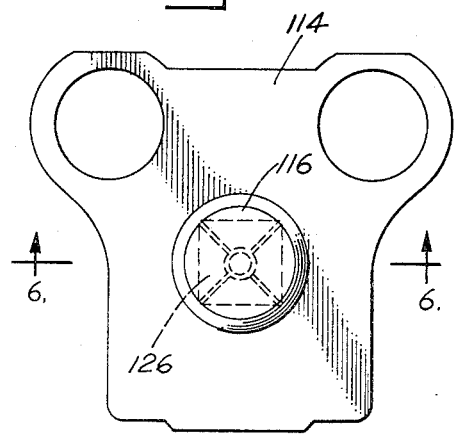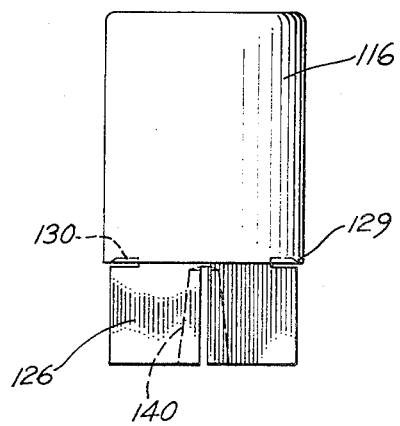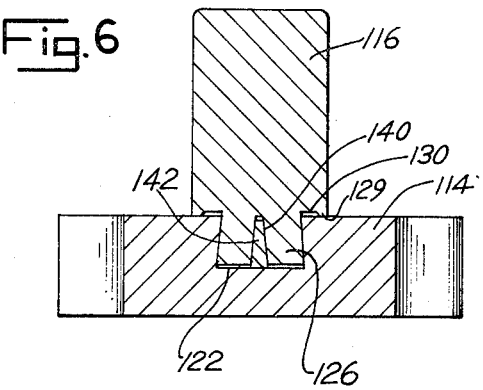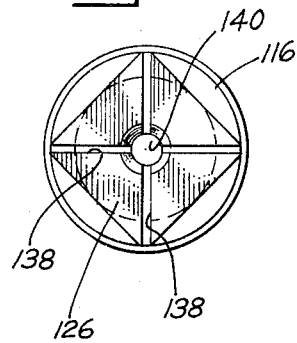

United States Patent Office 3,489,050
Patented Jan. 13, 1970

3,489,050
DIE SET PUNCHHOLDER SHANK CONSTRUCTION
Robert L. Silberman, Highland Park, Ill., and Lester L. Logan, Berea, Ohio, assignors to Die Supply Corporation, a corporation of Ohio
Filed Mar. 6, 1968, Ser. No. 710,794
Int. Cl. B26d 1/00
U.S. Cl. 83—698       5 Claims

ABSTRACT OF THE DISCLOSURE

A die set is comprised of a die shoe and a punchholder mounted for precise guided movement toward and away from one another. Secured to the punchholder by means of epoxy bonding is one end of a shank. The shank end is in part defined by a shoulder having an undercut recess for confining excess epoxy. The end portion of the shank to be inserted into a blind hole in the punchholder may be formed to receive a dowel pin, such that as the shank end is inserted into the hole, the dowel pin will spread the lower portion of the shank to provide more secure affixation of the shank end within the punchholder.

Background of the invention

This invention relates to a die set comprising a die shoe and a punchholder and, more particularly, to an improvement in assembly of a shank to a punchholder in a die set.

In so-called catalog die sets, there are a variety of thicknesses of die shoe and punchholder, as well as a number of shank diameters and shank locations. The inventory problems in storing assembled die sets are burdensome, both to the manufacturer and to his local distributors or local warehousemen. Inventory headaches could be reduced, if it were possible to reduce the requirements for assembled die sets. One solution would be to simplify connection of the shank to the punchholder, so that such operation could be performed in the field at the time a specified die set is called for.

Heretofore, a common method of affixing the shank to the punchholder was by welding. A hole was drilled entirely through the punchholder at the desired location. The hole was then bored and reamed to a precise dimension and a selected shank that had been previously machined to the desired diameter was inserted into the hole in the punchholder. After welding the shank in place, it was necessary to machine both the surfaces of the punchholder and to turn the shank to size. Such machining was done by the manufacturer at a central facility.

Another method of affixing a shank to a punchholder in a die set was by externally threading a reduced end portion of the shank, forming a hole entirely through the punchholder, tapping such hole and then screwing the shank into the hole. Because of the tendency of the shank to unthread from the punchholder in use, a lock screw or "Dutchman" was engaged with the shank and punchholder from a face opposite the shank so as to maintain the shank securely in engagement with the punchholder. However, due to vibration in use, the "Dutchman" sometimes worked loose with the result that the shank could loosen within the punchholder.

It is apparent that there is a need for an improved connection between the shank and punchholder in a die set that would be strong and long-lasting, yet could be performed in the field by relatively unskilled persons. If assembly of the shank and punchholder could be performed in the field, then the need for storage of assembled die sets would be reduced as punchholder subassemblies could be readily built up as needed.

An object of the present invention is to provide an improved die set incorporating novel punchholder and shank connection means, wherein the disadvantages and deficiencies of prior constructions are obviated.

Another object of the present invention is to provide improved means for joining the shank to the punchholder in a die set, whereby the assembly of shank and punchholder can be performed in the field by relatively unskilled persons, with the result that the necessity for inventories of assembled punchholder and shank subassemblies may be reduced. Other objects and advantages of the present invention will become more apparent hereinafter.

Brief description of the drawing

Preferred embodiments of the present invention are illustrated in the attached drawing, wherein:

FIG. 1 is a perspective view of a die set embodying the present invention;

FIG. 2 is a plan view of one form of shank and punchholder assembly;

FIG. 3 is a cross-sectional view taken generally along the line 3—3 of FIG. 2;

FIG. 4 is a side view of a shank of the present invention;

FIG. 5 is a plan view of a modified shank and punchholder assembly of the present invention;

FIG. 6 is a cross-sectional view taken generally along the line 6—6 of FIG. 5;

FIG. 7 is an elevation view of the shank of FIGS. 5 and 6; and

FIG. 8 is a bottom view of the shank of FIG. 7.

Description of the preferred embodiments

Referring to FIG. 1, there is illustrated a die set 10 embodying the present invention. The die set 10 is comprised of two parts, a die shoe 12 which is adapted to be secured to the bolster in a punch press, and a punchholder 14. The punchholder 14 includes a shank 16, which is adapted to be connected to a ram in the punch press. The punchholder 14 is adapted to be guided for precise movement toward and away from the die shoe 12 by appropriate guide means. As shown, the guide means include a pair of like guide pins 18 that are secured at their lower ends to the die shoe 12 and extend upwardly at right angles to the surface of the die shoe. Connected to the punchholder 14 (as, for example, by a force fit) and depending therefrom are bushings 20, which are adapted to cooperate with the guide pins 18.

Referring now to FIGS. 2, 3 and 4, there is better illustrated the improved means for securing the shank 16 to the punchholder 14. A blind hole 22 is drilled into the punchholder 14. The hole 22 extends only partially through the thickness of the punch holder. It does not extend entirely through the punchholder, as it is desired that it not interfere with finished surface 24 of the punchholder to which a tool is to be secured. After drilling, hole 22 is tapped to form internal threads therein.

The lower end 26 of the shank 16 is externally threaded with threads which cooperate with the internal threads in the hole 22. The end portion 26 of shank 16 and hole 22 are of a complementary size and configuration. In the embodiment of FIGS. 1–4, the end portion 26 and the hole are round or circular in cross-section. An epoxy adhesive is placed on the threads of both the shank end portion 26 and the threads in the hole 22. The shank end portion 26 is then threaded into the hole until shoulder 29 abuts the top surface of the punchholder 22, and the epoxy is cured to effect a firm bond. Curing may be done at room temperature, however, it is preferred that an elevated temperature be used, in the range of 200–300° F., depending upon the specific epoxy used. A longitudinal bore 28 may be provided in the shank 16 to receive a temperature probe for proper control of the epoxy cure. The punchholder and shank are brought up to curing temperature and held at curing temperature for an appropriate time.

In a central high volume place of manufacture and assembly, the curing may be done in curing ovens, however, such ovens are relatively costly and may be inconvenient at field locations. At field locations, a band heater may be wound around the shank, and the necessary heat for curing will be provided primarily by conduction through the shank to the cooperating threads in the opening 22 and the portion 26 of shank 16.

With particular reference to FIGS. 3 and 4, it will be noted that the undersurface or shoulder 29 of the shank 16 is undercut or recessed annularly thereof about the portion 26 and inwardly from the peripheral edge of the shoulder, so as to define a space 30 between the shank 16 and the top of the punchholder 14. The undercut is important in that it defines a recess or relief reservoir to receive excess epoxy and avoid flow of such epoxy onto the top surface of the punchholder during curing, or during assembly of the shank to the punchholder. The reservoir is of sufficient size to retain excess epoxy, and, thus, obviate any subsequent need for clean-up.

It is further to be noted by reference to FIGS. 2 and 4, that an elongated slot or groove 31 is provided in the threads on the portion 26, so as to provide an opening for venting excess epoxy and air from the bottom of the blind hole during assembly of the shank to the punchholder, and during curing of the epoxy.

Turning now to FIGS. 5–8, there is illustrated another form of the present invention. The punchholder 114 is formed with a square hole or opening 122. The hole has a flat bottom and has a small degree of taper from the top of the bottom, that is, the transverse cross-section of the hole is larger at the bottom thereof than at the top.

The shank 116 is formed with a square stub or lower portion 126 which is substantially complementary in cross-section to the hole 122 and which is slightly shorter in length than the depth of the hole 122. Diagonal slots 138 are formed in the square stub 126 of the shank 116. A tapered hole 140 is formed in the shank stub 126. The axis of the hole 140 is coextensive with the axis of the shank 116.

Dowel pin 142 is inserted into the tapered hole 140 during assembly of the shank 116 to the punchholder 114, so as to cause a spreading of the lower portion of the stub 26 to effect a more positive securement of the shank 116 to the punchholder 114.

As in the case of the first embodiment of the invention considered, an epoxy bonding material is applied to the cooperating surface of the shank stub 126 and the hole in the punchholder 114 before assembly. After assembly, the epoxy is cured.

When the square stub 126 of the shank 116 is inserted into the hole 22, the dowel 142 will be forced into the hole 140 to expand the stub 126 of the shank and cause a snug engagement between the stub 126 and the punchholder. The dowel and hole or bore 140 are constructed and arranged, so that the dowel will be entirely within the bore 140, so that the shoulder 129 of the shank 116 may be seated against the top surface of the punchholder. The epoxy material will fill all voids, so that after curing, the parts will be permanently bonded to one another.

The shank 116 is provided with an annular undercut portion in shoulder 129 about the stub portion 126, so as to provide a reservoir 130 for receiving excess epoxy. As aforenoted in connection with the first described embodiment, this configuration is advantageous in order to prevent undesirable spreading of the epoxy onto the surface of the punchholder during assembly or during curing. In this manner, the need for further clean-up of the shank or punchholder after assembly is substantially obviated.

There has been provided by the present invention improved means for connecting a punchholder and shank. The shank is specially formed and then epoxy bonded to a punchholder, so that the actual assembly may be performed in the field by persons relatively unskilled.

While we have shown and described presently preferred forms of the invention, it will be understood that the invention is not limited thereto, since it may be otherwise embodied within the scope of the following claims.

We claim:

1. For use in a die set, a shank and punchholder subassembly comprising a punchholder having a flat bottom surface and a top surface having a blind hole therein of a predetermined size and configuration and to a given depth, a shank having a shoulder adjacent one edge, said shoulder being spaced from said edge a distance equal to the given depth of the blind hole, the end portion of the shank from the shoulder to said one edge being of a complementary size and configuration to said blind hole, the shoulder having a recess therein inwardly from the peripheral edge, the end portion of the shank being bonded in the blind hole by an epoxy bonding agent, with the shoulder of the shank in engagement with the top surface of the punchholder and with excess epoxy being trapped and retained in the space defined by the recess between the shoulder and the top surface of the punchholder.

2. A shank and punchholder subassembly as in claim 1, wherein said hole is threaded and said end portion of the shank is threaded with complementary threads, said hole and said end portion of the shank being round in cross-section, and venting means are provided for venting excess epoxy and air from the bottom of the blind hole.

3. A shank and punchholder subassembly as in claim 2, wherein said venting means includes a venting groove in the end portion of said shank, said venting groove extending from said one edge of said shank to said shoulder.

4. A shank and punchholder subassembly as in claim 1, wherein said hole is tapered from top to bottom such that the bottom of the hole has a greater cross-section than the top of the hole, the end portion of the shank being initially slightly less in size than the hole and means for expanding the end portion of the shank to effect a snug fit between the end portion of the shank and the wall of the punchholder defining the blind hole when in assembled relationship.

5. A shank and punchholder subassembly as in claim 1, wherein the hole and the end portion of the shank are each square in cross-section, said end portion of the shank having slots therein for permitting expansion of the end portion, a bore in said end portion of the shank extending inwardly from said one edge, and dowel means engaging in said bore for expanding the end portion during seating of the end portion in the blind hole, said dowel means and bore cooperating so that the end portion of the shank is expanded into snug engagement with the wall defining the blind bore, without interference of the dowel means with the depth of seating of the end portion in the blind hole.

References Cited

UNITED STATES PATENTS

| | | | |
|---|---|---|---|
| 3,279,297 | 10/1966 | Smiltneek | 83—698 |
| 3,402,623 | 9/1968 | Bennett | 83—698 X |

FRANK T. YOST, Primary Examiner